June 13, 1950      T. BROWN      2,511,692
TRACTOR AND STEERABLE SUPPORT THEREFOR
Filed Aug. 6, 1945      3 Sheets-Sheet 1
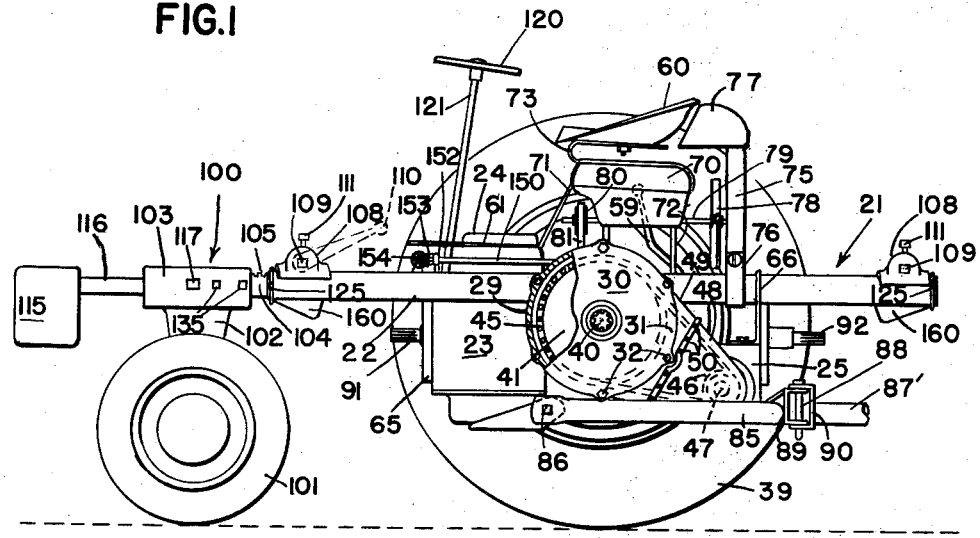

June 13, 1950 T. BROWN 2,511,692
TRACTOR AND STEERABLE SUPPORT THEREFOR
Filed Aug. 6, 1945 3 Sheets-Sheet 2
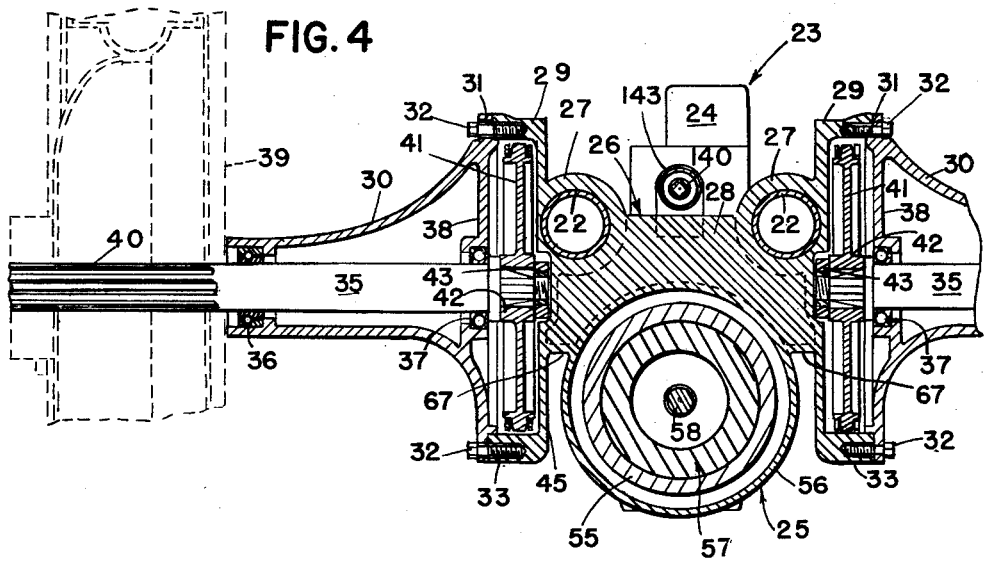
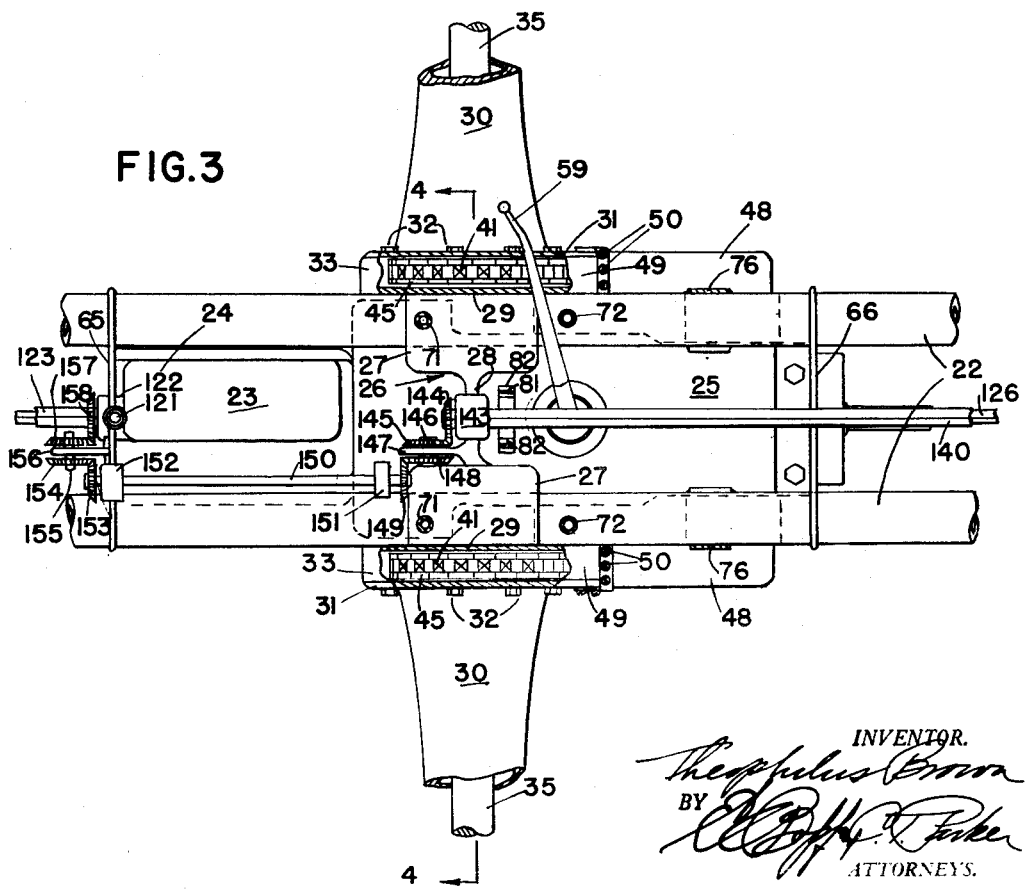
INVENTOR.
ATTORNEYS.

June 13, 1950     T. BROWN     2,511,692

TRACTOR AND STEERABLE SUPPORT THEREFOR

Filed Aug. 6, 1945     3 Sheets-Sheet 3

Patented June 13, 1950

2,511,692

UNITED STATES PATENT OFFICE 2,511,692

TRACTOR AND STEERABLE SUPPORT THEREFOR

Theophilus Brown, Moline, Ill., assignor to Deere & Company, Moline, Ill., a corporation of Illinois Application August 6, 1945, Serial No. 609,047

4 Claims. (Cl. 180—1)

The present invention relates generally to tractors, and has for its principal object the provision of a novel and improved general purpose tractor intended especially for farm use.

The conventional general purpose farm tractor is provided with a longitudinally extending body on which means are provided for supporting implements associated with the tractor. The body is carried on a pair of laterally spaced rear traction wheels and a dirigible truck mounted at the forward end of the body. This is a completely satisfactory arrangement for certain purposes, such as for cultivating two crop rows simultaneously, in which case the rear traction wheels are spaced apart sufficiently to straddle two rows of crops, while the front dirigible truck is mounted on either a single wheel or a pair of closely spaced wheels which travel between the two rows of crops, and the two sets of cultivating tools are supported along opposite sides of the tractor body, respectively, adjacent the dirigible wheeled truck, thus providing for accurately guiding the cultivating tools along the crop rows by the steering mechanism of the tractor.

For some other purposes, however, it is more desirable to have the dirigible truck in the rear of the traction wheels. This arrangement is obtainable by driving the tractor backwards with an implement mounted ahead of the tractor, such as, for example, a harvester platform or other crop gathering device. This arrangement provides for turning square corners, permitting the tractor and harvesting implement to drive into the corner of a field and turn a square corner along the fence. It is rather difficult, however, to drive a tractor backwards in this fashion, although arrangements have been proposed in the past for reversing the operator's seat and controls to permit the operator to sit in a normal position while driving the tractor in reverse, and additional transmission gears are provided for obtaining the normal forward speed ratios with the tractor running backwards. This type of arrangement, however, requires considerable rebuilding of the tractor and it is not convenient to change the tractor arrangement from normal operation to reverse operation and vice versa.

Therefore, one of the principal objects of the present invention relates to the provision of a tractor which can be readily converted from a tractor with dirigible wheels ahead of the traction wheels to a tractor having dirigible wheels behind the traction wheels, and vice versa.

More specifically, it is an object of my invention to perform this conversion without the necessity for elaborate changes in the power transmission and control mechanism.

In the accomplishment of this object, I have provided a tractor having a power plant located substantially centrally with respect to the traction wheels in generally balanced relation to the axis thereof, and a longitudinally extending frame which extends fore and aft from the axis of the traction wheels, with a dirigible wheeled truck which can be readily attached to either end of the longitudinal frame. This arrangement has the advantage that the weight of the tractor and operator is concentrated mainly on the rear traction wheels, which are easily provided with tires having sufficient capacity to support this weight, thereby providing sufficient weight on the wheels to obtain ample tractive effort without the use of additional wheel weights or without the necessity for filling the pneumatic tires with liquid for weighting the same, and at the same time relieving the front wheels of the weight of the tractor, thereby to make available additional weight carrying capacity of the dirigible truck. This is important in the case of those implements which are large and heavy but which must be supported to a large extent upon the dirigible truck, such as, for example, sweep rakes, manure loaders, corn pickers, etc. Although this type of arrangement leaves the dirigible truck with too little load thereon for convenient operation when no implement is carried by the tractor, this can be readily taken care of by weighting the dirigible truck when it is desired to operate the tractor without an implement mounted on the forward part thereof.

Another object relates to the provision of means for mounting the dirigible truck on either end of the longitudinal tractor frame for fore and aft adjustment thereof relative to the traction wheels. This provides for changing the wheel base of the tractor between a short wheel base which provides for flexible maneuvering of the tractor and making short radius turns, and a long wheel base which provides ample room between the dirigible truck and the tractor engine for receiving certain implements adapted to be mounted in this position, such as, for example, cultivating tools, cotton harvesting implements, planting implements, and the like. It is a feature of the present invention that the fore and aft adjustment of the dirigible truck can be made with the latter either ahead of the traction wheels or behind the traction wheels.

In the accomplishment of these objects, the frame of the tractor is made up of a pair of parallel tubular members extending longitudinally ahead of and behind the axis of the traction wheels. The dirigible truck is mounted on a pair of laterally spaced members which are adapted to be inserted into either the front or rear end of the tubular members in telescoping relation. The tractor wheel base is thus adjustable by extending or contracting the telescoping frame members.

Still another object relates to the provision of a novel and improved unstable traction element which can be readily connected to any of several implements having dirigible wheeled truck supports. Still another object relates to the provision of a traction unit which has great lateral stability by virtue of the low mounting of the power unit on the frame. A related object has to do with the provision of a compact arrangement of the power unit in which the operator's seat and fuel tank are disposed above the transmission housing just behind the engine, with the radiator disposed immediately behind the tractor seat.

Another object relates to the provision of two different dirigible trucks having widely spaced and closely spaced wheels, respectively, which can be optionally mounted on either end of the tractor frame.

These and other objects and advantages of my invention will be apparent to those skilled in the art, after a consideration of the following description, in which reference is had to the drawings appended hereto, in which Figure 1 is a side elevational view of a tractor embodying the principles of the present invention, with the near traction wheel removed to expose the details of the traction unit, and a portion of the gear case broken away to show the drive mechanism;

Figure 2 is a top plan view of the tractor;

Figure 3 is a fragmentary top plan view, drawn to a larger scale, showing the central portion of the body of the tractor, with the operator's seat, fuel tank, and radiator cut away to show the means for mounting the power plant on the tractor frame;

Figure 4 is a sectional elevational view taken substantially along a line 4—4 in Figure 3;

Figure 5:
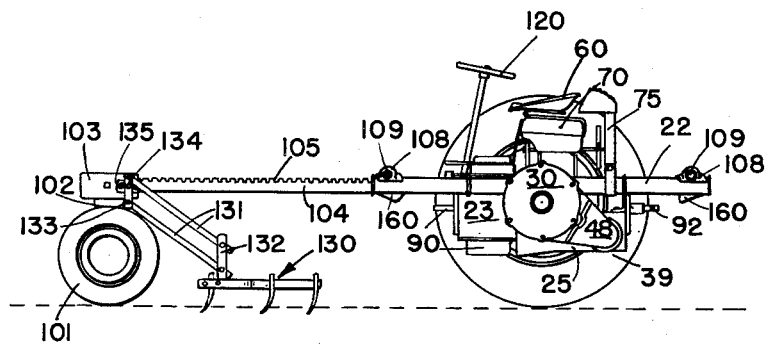
Figure 5 is a side elevational view, similar to Figure 1 but drawn to a smaller scale, showing the tractor as used for cultivating, with the wheel base elongated.

Referring now to the drawings, and more particularly to Figures 1-4, inclusive, the tractor comprises a longitudinally extending body including a frame 21 comprising a pair of laterally spaced longitudinally extending, parallel tubular members or frame elements 22, which carry therebetween a power plant and traction unit 23, comprising an internal combustion engine 24 with a transmission gear casing 25 rigidly secured thereto. This unit is mounted on the parallel frame members 22 by means of a support member in the form of a casting 26 having a pair of tubular sleeve portions 27 receiving the tubular frame members 22 and interconnected by a transverse web 28. The sleeve portions 27 are securely fixed to the parallel frame members 22 as by welding or other suitable means. The casting 26 also includes a pair of gear housing portions 29 disposed on opposite sides of the frame members 27, respectively, and preferably formed integrally with the support casting 26. The gear housing portions 29 open outwardly and are covered by the outwardly flaring inner ends of a pair of axle housings 30, respectively, the latter being provided with flanges 31 which are secured by bolts 32 to the annular rims 33 of the gear housings 29.

A pair of drive axles 35 are journaled in the axle housings 30, respectively, on laterally spaced bearings 36, 37, the inner bearings 37 being supported in radially extending walls 38, as best shown in Figure 4. The axles 35 project outwardly beyond the outer ends of the axle housings 30 and carry a pair of traction wheels 39, respectively, which are mounted thereon by any conventional means (not shown), the outer ends of the axles being splined, as indicated at 40, for the purpose of lateral adjustment of the wheels 39 with respect to the axles 35, as is well known to those skilled in the art. Each of the axles 35 is provided at its inner end with a sprocket gear 41, which has a hub 42 suitably keyed to the shaft 35 and secured thereto by a nut 43 engaging the inner end of the axle 35, which is threaded for this purpose.

Each of the sprockets 41 is connected by a drive chain 45 with a drive sprocket 46 (see Figure 1) mounted on a differential drive shaft 47. The two drive sprockets 46 are enclosed in laterally oppositely disposed enclosures 48 on the opposite sides of the transmission housing 25, the differential shafts 47 being in axial alignment and connected to suitable differential drive mechanism (not shown) disposed within the transmission housing 25. The enclosures 48 are adapted to register with rearwardly extending chain housing portions 49 in the sprocket gear casings 29 and are secured thereto by suitable bolts 50. Thus, the engine 24 drives the two drive axles 35 through the transmission mechanism within the casing 25, the differential shafts 47, the drive sprockets 46, and the drive chains 45 which are trained over the sprockets 41, respectively. Figure 4 shows the flywheel 55 of the engine enclosed with a clutch housing 56 which is part of the transmission housing 25, and a clutch plate 57 of a conventional clutch which drives the transmission shaft 58. A gear selecting lever 59 is mounted on the top of the transmission housing 25 and extends upwardly between the frame members 22 and inclined outwardly from under the operator's seat 60 to a point conveniently accessible to the operator on the seat 60.

The operator's platform 61 is disposed over the engine just ahead of the operator's seat 60, with the upper portion of the engine 24 projecting through an opening in the platform. In the interest of simplicity, the clutch pedal and its connections as well as the differential brake control pedals and other controls of the tractor are omitted inasmuch as they form no part of the present invention, but may be of any conventional design and arrangement.

The forward end of the engine 24 is securely bolted to a supporting plate 65, which extends transversely between the tubular frame members 22 and is rigidly welded thereto. Similarly, the rear end of the transmission housing 25 is secured, as by bolting, to a transverse supporting plate 66, which is rigidly welded to the tubular members 22 in rearwardly spaced relation to the supporting plate 65. The clutch housing 56 has a portion integrally formed with the vertical transverse web 28 of the support casting 26 and also with a pair of horizontal flange portions 67 which are integral with the web 28 and the gear housings 29.

Directly above the transmission housing 25, just behind the internal combustion engine 24, is a fuel tank 70, supported on front and rear laterally spaced legs 71, 72, which are mounted on the sleeve portions 27 of the castings 26 and on the two frame members 22 behind the sleeve portions 27, respectively. The seat 60 is mounted on a spring support 73 which is carried on top of the fuel tank 70.

A radiator 75 is provided for cooling water of the engine 24 and is disposed vertically behind the seat 60 and fuel tank 70 and is mounted on brackets 76, which are secured, as by welding, to the two tubular frame members, 22, respectively. The radiator 75 is provided with an upper reservoir 77, disposed immediately behind the seat 60. The hose connections between the radiator and the engine 24 are omitted for the sake of simplicity, since they do not comprise a part of the present invention. A fan 78 is mounted directly in front of the radiator 75 on a shaft 79, which extends forwardly beneath the fuel tank 70 and is provided at its forward end with a pulley 80, over which a belt 81 is trained and extends downwardly through the apertures 82 in the top of the transmission housing 25 and is driven by the flywheel 55.

A U-shaped drawbar 85 is pivotally connected by transversely aligned bolts 86 to a transverse member 87 extending across the bottom of the power unit 23 and is vertically adjustable about the axis of the bolts 86. The drawbar 85 is adapted to be connected to the tongue 87' of a trailing implement, by means of a draft pin 88, which extends vertically through aligned apertures in a pair of connectors 89, 90, rigidly fixed to the drawbar 85 and the tongue 87', respectively.

The power unit 23 is provided with a pair of forwardly and rearwardly extending power take-off shafts 91, 92, which are suitably connected to be driven by the engine 24 for supplying power to implements ahead of or behind the traction wheels, respectively.

Thus, it will be evident that the device thus far described comprises a two wheeled unstable power unit, which is approximately balanced about the transverse axis of the wheels 39 and which has a forwardly and rearwardly projecting frame 21.

A dirigible wheeled truck 100 supports the forward end of the tractor frame 21 (Figures 1 and 2) and comprises a pair of ground engageable wheels 101, which are set comparatively close together on opposite sides of the center line of the tractor and are journaled on a steering post 102 for rotation in planes which diverge upwardly and outwardly, as is common in general purpose farm tractors. The two wheels 101 are adapted to travel between a pair of crop rows during operation in a field, and the traction wheels 39 are spaced to straddle the same two rows, as is well known to those skilled in the art.

The steering post 102 is mounted on a supporting casting or frame portion 103, to which is fixed a pair of parallel members or frame parts 104, which are inserted into the forward ends of the two parallel tubular frame members 22, respectively, and extend into the latter in telescoping relation. The top of each of the members 104 is provided with rack teeth 105, which are engaged by a pinion 106, best shown in Figure 2, mounted on a transverse shaft 107, which is journaled in a pair of pinion housings 108, the latter being mounted on the two tubular frame members 22, respectively. The two pinions 106 are rigidly fixed to the shaft 107 adjacent opposite ends thereof, so that by rotating the shaft 107 the pinions drive the rack teeth on the truck members 104 to shift the latter into or out of the tubular frame members 22, selectively. The shaft 107 is provided with a square end portion 109, which can be turned manually by means of any suitable wrench or crank, indicated in dotted lines by reference numeral 110, which is used to adjust the dirigible wheeled truck 100 fore and aft relative to the traction wheels 39 to adjust the wheel base of the tractor, after which the crank 110 can be removed and stored in any convenient location. The dirigible wheeled truck 100 is secured in longitudinally adjusted position by means of set screws 111 threaded into suitable openings in the tops of the pinion housings 108 and engageable with the teeth of the pinions 106 to prevent rotation of the latter.

Since the weight of the power unit 23 is concentrated on the rear traction wheels 39, the dirigible truck 100 would be too lightly loaded to provide for satisfactory steering, without additional weight on the truck 100 and it may be desirable to weight the front truck 100 by means of a counterbalancing weight 115, which is fixed to a pair of parallel members adapted to be inserted into the forward ends of the parallel truck mounting members 104, the latter being made tubular to receive the members 116. The latter are sufficiently long to permit the weight 115 to be shifted fore and aft relative to the dirigible wheeled truck 100, and the weight 115 is secured in longitudinally adjusted position by means of set screws 117, which are inserted through threaded apertures in the sides of the truck casting 103 and the tubular members 104 to engage the members 116. Thus, by shifting the weight 115 forwardly away from the dirigible truck 100, the moment arm of the weight 115 is increased, thereby tending to have an increased effect in holding the wheels 101 down against the ground. However, when the truck 100 is adjusted forwardly away from the traction wheels 39 to obtain a longer wheel base, the weight of the truck 100 is thus extended to a longer moment arm to increase its resistance against upward movement away from the ground, and therefore the weight 115 can be adjusted inwardly toward the truck 100, or can even be omitted entirely.

The steering of the dirigible truck 100 is under control of a steering wheel 120 mounted on a steering shaft 121 disposed ahead of the operator's seat 60. The lower end of the steering shaft 121 is connected by a conventional gear mechanism within a casing 122 mounted on the transverse supporting plate 65, with a forwardly extending generally horizontal tubular shaft portion 123 of square cross section, which is suitably journaled in the case 122 at its rear end and is journaled in a bearing 124 at its forward end. The bearing 124 is mounted on a transverse supporting plate 125 rigidly fixed to the forward ends of the tubular frame members 22. The tubular shaft 123 is connected to the steering post 102 of the dirigible truck 100 by means of a shaft portion 126 of square cross section, which is inserted into the forward end of the tubular shaft 123 and is slidable but non-rotatable therein. A bevel pinion 127 is mounted on the forward end of the square shaft 126 and meshes with a bevel gear 128 fixed to the upper end of the steering post 102. When the truck 100 is adjusted longitudinally relative to the frame members 22, the shafts 123, 126 are extended or contracted in telescoping relation to maintain control of the steering of the truck 100 by the steering wheel 120.

When the tractor is to be used for cultivating, the truck 100 is shifted forwardly to a position, as illustrated in Figure 5. The increased wheel base thus obtained, provides ample room for cultivator rigs 130, which can be of any conventional design, preferably one in which each rig is supported on a pair of vertically spaced substantially parallel links 131 connected between a vertical bracket 132 on the rig 130 and a bracket 133 on a transversely extending beam 134 secured to the casting 103 by bolts 135. It will be noted that with the steering wheel 101 and cultivator rig 130 positioned appreciably ahead of the traction wheels 39, the cultivators can be accurately guided along the crop rows by the steering wheel 120 to accommodate any unevenness in the crop rows.

Figure 6:
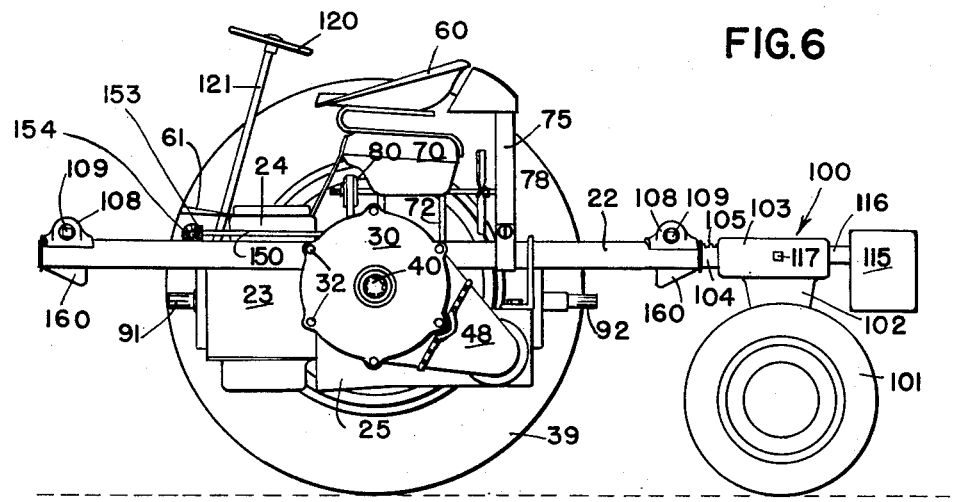
Figure 6 is a side elevational view, similar to Figure 1, but with the dirigible wheeled truck mounted on the rear end of the frame rather than on the forward end of the frame.

Referring now more particularly to Figure 6, the dirigible wheeled truck 100 can be removed from the front ends of the tubular members 22 by sliding the parallel members 104 out of the forward ends of the members 122, and the truck 100 can be remounted on the rear ends of the members 22 by inserting the members 104 therein. The rear ends of the tubular members 22 carry a pair of housings 108, within which are disposed a similar pair of pinions 106 adjustable by means of a transverse shaft 107 having a squared end 109 adapted to receive the adjusting crank 110. Thus, the shaft 107 can be rotated to adjust the wheel base of the tractor with the dirigible truck 100 spaced rearwardly from the traction wheels in a manner similar to that described above, in which the truck 100 was adjustable longitudinally at the forward end of the tractor frame 21. With the truck 100 at the rear of the tractor, the steering shaft portion 126 is insertable into a longitudinally extending tubular control shaft portion 140 of square cross section, which is journaled at its rear end in a bearing 141 mounted on a transverse supporting plate 125 fixed to the rear end of the tubular members 22. The forward end of the control shaft 140 is journaled in a bearing 143, which is rigidly mounted on the web 28 of the casting 26. A bevel gear 144 (see Figure 3) is mounted on the forward end of the tubular shaft 140 and meshes with a bevel gear 145 which is fixed to a shaft 146 journaled in a forwardly extending web 147 formed integrally with the web 28 of the casting 26. A second bevel gear 148 is fixed to the opposite end of the shaft 146 and meshes with a bevel gear 149 mounted on the rear end of a shaft 150 which is journaled in a bearing 151 carried on one of the frame members 22. The shaft 150 extends forwardly along one side of the engine 24 and is journaled at its forward end in a bearing 152 mounted on the transverse plate 65. The forward end of the shaft 150 carries a bevel gear 153 which meshes with a gear 154 carried on a shaft 155 which is journaled in an arm 156 secured to the transverse plate 65. The shaft 155 is connected to the tubular shaft 123 of square cross section by means of a pair of intermeshing bevel gears 157, 158. Thus, it will be evident that the steering wheel 120 is connected to both the forwardly and rearwardly extending tubular shafts 123, 140 in order that the dirigible wheels 101 can be controlled by the steering wheel 120 in either the front or rear positions.

With the dirigible wheels 101 positioned rearwardly of the traction wheels, it will be evident to those skilled in the art that square turns can be made by the tractor for the purposes explained herein above.

In the interest of safety, I have provided a pair of transversely extending ground engageable shoes 160 mounted at the front and rear ends of the frame members 22, respectively, and rigidly secured thereto. It will be noted that the frame members extend forwardly and rearwardly a sufficient distance to cause one of the shoes 160 to engage the ground in case the weight of the dirigible truck 100 is insufficient to prevent the tractor from tipping in either position of the truck 100, or in case the tractor should tip when the truck 100 is removed from the tractor frame.

I do not intend my invention to be limited to the particular details shown and described herein, except as set forth by the claims which follow.

I claim:

1. In a tractor having a longitudinal main frame including front and rear end portions and a power plant and traction unit supporting the frame intermediate its ends, the improvement comprising: a steerable support, having a longitudinal frame part cooperative in telescoping relation with the main frame at either the front or rear end of the latter; steering control means on the power plant and traction unit main frame, including an operative shaft element extending longitudinally of the main frame and having front and rear end portions respectively proximate to front and rear end portions of the main frame; and a steering control part on the steerable support cooperative in telescoping relation with the shaft element at either end portion of the former, according to the position of the steerable support.

2. In a tractor having a power plant and traction unit including front and rear ends and having thereon an operator's station provided with a steering control member, the improvement comprising: means providing at the front end of the power plant and traction unit a pair of laterally spaced, forwardly extending frame elements; means providing at the rear end of said unit a pair of similar laterally spaced but rearwardly extending frame elements; means on said unit operatively connected to the steering control member and including a front shaft portion and a rear shaft portion projecting respectively forwardly and rearwardly between the respective frame elements; and a steerable ground-engaging rolling support including a frame portion having a pair of laterally spaced, longitudinally projecting frame parts receivable in supported relationship selectively by either of the aforesaid front or rear frame elements and a longitudinal shaft portion disposed between the frame parts and operatively receivable selectively by either of the aforesaid front or rear shaft portions on the power plant and traction unit.

3. The invention defined in claim 2, further characterized in that: each pair of frame elements on the power plant and traction unit and the pair of frame parts on the rolling support having provision for longitudinal adjustment whether the rolling support is positioned at either the front or rear end of the power plant and traction unit; and both shaft portions on the power plant and traction unit and the shaft portion on the rolling support having provision for longitudinal adjustment to accommodate longitudinal adjustment of the frame elements and frame parts.

4. The invention defined in claim 2, further characterized in that: the front and rear frame elements are respectively at front and rear ends of a pair of parallel, continuous tubular members, and the traction unit has means thereon rigidly fixing said members in position; the frame parts of the rolling support are selectively receivable telescopically by the front or rear ends of said members; and means is provided for fixing the frame parts in position at either pair of ends of said members.

THEOPHILUS BROWN.

REFERENCES CITED

The following references are of record in the file of this patent:

UNITED STATES PATENTS

| Number | Name | Date |
|---|---|---|
| 1,106,104 | Marx | Aug. 4, 1914 |
| 1,154,505 | Gentle | Sept. 21, 1915 |
| 1,180,327 | Simpson | Apr. 25, 1916 |
| 1,210,056 | Fairman | Dec. 26, 1916 |
| 1,211,332 | Mehrings | Jan. 2, 1917 |
| 1,273,652 | Olerich | July 23, 1918 |
| 1,275,123 | Brown | Aug. 6, 1918 |
| 1,277,434 | Leadbeater | Sept. 3, 1918 |
| 1,355,826 | Fawver | Oct. 19, 1920 |
| 1,524,317 | Schon et al. | Jan. 27, 1925 |
| 1,579,563 | Newton-Clare | Apr. 6, 1926 |
| 1,876,568 | Carlson | Sept. 13, 1932 |
| 1,933,540 | Brown | Nov. 7, 1933 |
| 2,090,154 | Ronning | Aug. 17, 1937 |
| 2,307,966 | Sloane | Jan. 12, 1943 |
| 2,374,533 | Fulton | Apr. 24, 1945 |

FOREIGN PATENTS

| Number | Country | Date |
|---|---|---|
| 365,747 | France | July 5, 1906 |
| 499,381 | Great Britain | Jan. 20, 1939 |
| 635,854 | France | Jan. 3, 1928 |
| 667,773 | Germany | Nov. 19, 1938 |
| 828,225 | France | Feb. 7, 1938 |